(12) United States Patent
Guth (10) Patent No.: US 9,221,110 B2
(45) Date of Patent: Dec. 29, 2015

(54) POWER SAW APPARATUS WITH INTEGRATED DUST COLLECTOR

(75) Inventor: Paul Guth, Moreno Valley, CA (US)

(73) Assignee: JPL GLOBAL, LLC, Moreno Valley, CA (US)

( * ) Notice: Subject to any disclaimer, the term of this patent is extended or adjusted under 35 U.S.C. 154(b) by 1464 days.

(21) Appl. No.: 12/587,234

(22) Filed: Oct. 2, 2009

(65) Prior Publication Data

US 2011/0079207 A1    Apr. 7, 2011

(51) Int. Cl.
| | | |
|---|---|---|
| B24B 55/04 | (2006.01) |
| B24B 55/10 | (2006.01) |
| B28D 1/04 | (2006.01) |
| B27G 19/04 | (2006.01) |
| B23D 45/16 | (2006.01) |
| B28D 7/02 | (2006.01) |
| B23D 59/00 | (2006.01) |

(52) U.S. Cl.
CPC .............. *B23D 45/16* (2013.01); *B23D 59/006* (2013.01); *B24B 55/04* (2013.01); *B24B 55/10* (2013.01); *B27G 19/04* (2013.01); *B28D 1/04* (2013.01); *B28D 7/02* (2013.01); *Y10T 83/0453* (2015.04)

(58) Field of Classification Search
CPC ...... B24B 55/04; B24B 55/05; B24B 55/052; B28D 1/04; B27G 19/02; B27G 19/04; B26D 7/22; B23D 45/16; B23D 59/006
USPC ............... 451/451, 454, 456; 30/124; 83/100, 83/473, 478; 125/13.01
See application file for complete search history.

(56) References Cited

U.S. PATENT DOCUMENTS

| | | | |
|---|---|---|---|
| 4,192,390 A | 3/1980 | Wanner et al. | |
| 4,241,505 A | 12/1980 | Bodycomb, Jr. et al. | |
| 4,403,534 A | 9/1983 | Altendorf et al. | |
| 4,661,129 A * | 4/1987 | Nederman | 96/408 |
| 5,074,044 A * | 12/1991 | Duncan et al. | 30/124 |
| 5,084,972 A * | 2/1992 | Waugh | 30/124 |
| 5,327,649 A * | 7/1994 | Skinner | 30/124 |
| 5,377,632 A | 1/1995 | Aronsson et al. | |
| 5,711,775 A * | 1/1998 | Field et al. | 96/426 |
| 6,027,553 A * | 2/2000 | Hirano et al. | 95/283 |
| 6,047,693 A | 4/2000 | Yamami et al. | |
| 6,155,246 A | 12/2000 | Yamami et al. | |
| 6,233,831 B1 | 5/2001 | Iida et al. | |
| 6,295,953 B1 * | 10/2001 | Ohsawa et al. | 123/41.7 |
| 6,595,196 B2 | 7/2003 | Bath | |

(Continued)

FOREIGN PATENT DOCUMENTS

EP          0793988          9/1997

*Primary Examiner* — Eileen Morgan
(74) *Attorney, Agent, or Firm* — Loza & Loza, LLP; Daniel Castro (57) ABSTRACT

A power saw having a circular saw blade or, grinding wheel incorporated to a dust collection system that is easily portable is disclosed herein. In a preferred embodiment, negative pressure and resulting air flow is provided at a lower blade guard to capture particulate matter as a byproduct of cutting a work piece. A unique dust collection housing is additionally provided having a filter to remove dust from air and exhaust the filtered air at a lateral side of the saw. A spin handle is additionally disclosed to increase the usable surface of the filter and to work in conjunction with a filter cleaning flap. A drive belt according to a preferred embodiment, drives the circular saw and a vacuum fan. Among the beneficial aspects of the power saw is its portability by obviating a need for a dust collection bag and/or a separate vacuum unit.

17 Claims, 8 Drawing Sheets

(56) References Cited

U.S. PATENT DOCUMENTS

| | | |
|---|---|---|
| 6,648,742 B1 | 11/2003 | Segiel, Jr. |
| 6,896,604 B1 | 5/2005 | Taylor et al. |
| 7,497,886 B2 | 3/2009 | Walker |
| 7,520,276 B2 | 4/2009 | Jakobsson et al. |
| 7,559,268 B2 | 7/2009 | Sasaki et al. |
| 7,691,164 B2 | 4/2010 | Kellermann |
| 8,388,415 B2 * | 3/2013 | Soika et al. .......... 451/178 |
| 2003/0224707 A1 | 12/2003 | Segiel, Jr. |
| 2004/0060407 A1 * | 4/2004 | Kao ............ 83/397 |
| 2005/0262978 A1 | 12/2005 | Hetcher et al. |
| 2006/0185484 A1 | 8/2006 | Sasaki et al. |
| 2007/0017191 A1 | 1/2007 | Miller et al. |
| 2007/0034064 A1 | 2/2007 | Nishikawa et al. |
| 2007/0289273 A1 * | 12/2007 | Boyd ............ 55/497 |
| 2008/0163492 A1 * | 7/2008 | Johansson ........ 30/124 |
| 2008/0229719 A1 | 9/2008 | Hayama et al. |
| 2008/0276776 A1 | 11/2008 | Kani et al. |
| 2009/0007440 A1 * | 1/2009 | Soika et al. ........ 30/388 |
| 2010/0058911 A1 * | 3/2010 | Goddard .......... 83/478 |
| 2010/0263511 A1 * | 10/2010 | Firth ............ 83/473 |
| 2011/0162501 A1 * | 7/2011 | Koegel et al. ........ 83/100 |

* cited by examiner

POWER SAW APPARATUS WITH INTEGRATED DUST COLLECTOR

BACKGROUND OF THE INVENTION

1. Field of the Invention

The present invention pertains generally to power masonry tools and related devices for cutting and grinding. More specifically, the present invention relates to portable type power saws driven by an internal combustion engine or electric motor and having dust abatement while cutting cinder block, concrete, brick, clay, stone, tile, and the like.

2. Description of the Prior Art

Circular saws using a rotating circular saw blade have been known for some time. Early versions include those employed by saw mills to make lumber. Hand-held circular saws have also been known for many decades that were first used mainly in woodworking applications. Improvements to saw blade design and material have lead to expanded applications for portable saws including masonry, plastic and even metal. Many such saws are currently powered by electric motors; however internal combustion motors may also be employed.

Also known, is a problem of uncontrolled release of and exposure to airborne dust and particulate matter resulting from cutting a workpiece. Accordingly, government agencies such as OSHA have promulgated safety and health requirements for wet and dry cutting. The California Occupational Safety and Health Act of 1973 requires employers to provide a safe and healthful work place and gives Cal/OSHA regulatory jurisdiction over all public and private employers in California. Henceforth, employers must be compliant with all regulations set forth in Title 8 of The California Code of Regulations. In addition to health issues, the dust by-products present a clean-up challenge, even if all individuals in a contained environment have donned respirators.

Development of wet cutting devices and methods is one solution to dust abatement. In doing so, water is applied at a blade cutting edge where dust is entrained to a fluid and directed to a holding area. While most wet cutting methods work relatively well, they create additional problems of waste water pollution and environmental concerns. Further, the slurry created will adhere to cutting tool materials and components that also require periodic cleaning.

Many prior art solutions have been proposed that specifically employ dry means to control dust in a portable hand-held saw. Two examples proposed by Yamami et al., U.S. Pat. Nos. 6,047,693 and 6,155,246, entitled "Dust Collector-Equipped Power Cutter," and "Power Cutter," both assigned to the Kioritz Corporation, describe a portable power saw having a vacuum fan for removing dust. More specifically, a conventional portable power saw includes a main body having a motor, a circular cutting blade with a safety cover surrounding upper and lower portions of the blade. The safety cover further provides a passageway for dust removal. One problem with these and other numerous examples is that an external bag is required to collect dust that reduces the portability of the apparatus. Another problem in the prior art is that dusty air is sucked through the fan continually that increases wear on the moving components. Another feature missing in the prior art is a design having a retractable shroud for maintaining proper alignment while moving along a stationary work piece.

In light of the above, it is an object of the present invention to provide a Power Saw Apparatus with Integrated Dust Collector that is highly portable and lighter in weight as compared prior art solutions. More specifically, it is an object of the present invention to provide a power saw that integrates dust collection to a single portable unit. It is still a further object of the present invention to provide a dry dust collection design that is easily maintained as dust accumulates. It is additionally an object of the present invention to more efficiently control dust by implementing a filter to a hand-held power saw design. It is further an object of the present invention to provide a retractable blade guard providing more flexibility while moving along a work piece. It is still further an object of the present invention to provide a design that includes a variety of innovative features over prior designs.

BRIEF SUMMARY OF THE INVENTION

The present invention specifically addresses and alleviates the above mentioned deficiencies, more specifically, the present invention, in a first aspect, is a power saw comprising: a structural arm coupled to and substantially parallel to a blade guard, the blade guard having upper and lower portions; a dust collection housing coupled to the structural arm and the blade guard; a cylindrical filter cartridge within the dust collection housing; and a fan connected downstream of the cylindrical filter cartridge, the fan providing negative pressure with respect to atmosphere at the blade guard lower portion to filter and collect dust from a work piece created as a byproduct from use of the power saw.

The power saw of a first preferred embodiment is further characterized as comprising: a saw motor mechanically coupled to a motor power pulley rotating a drive belt about a drive pulley; a circular saw blade mechanically coupled to the drive pulley; a fan pulley rotatable by the drive belt and mechanically coupled to the fan via a fan drive shaft; and a tensioning roller providing proper tension and alignment to the drive belt.

Further, the power saw may be characterized wherein the fan pulley is surrounded by a bearing block on front, rear and lower portions of the fan pulley, wherein the bearing block comprises a fan bearing providing rotational and translational support to the fan drive shaft. The blade guard lower portion further comprises: a retractable shroud about a pivot point; and a ridged jaw at a leading edge of the retractable shroud; and a roller configured to a lowest point on the ridged jaw, the roller for keeping the retractable shroud steady as it moves across the work piece.

Still further, the power saw may be characterized wherein the dust collection housing comprises: a fan housing configured between the structural arm and the cylindrical filter cartridge; a vacuum suction tube configured between the fan housing and the cylindrical filter cartridge; and a spin handle mechanically coupled to the cylindrical filer cartridge for rotating and optimizing the useful surface area thereof.

Yet further, the dust collection housing is further characterized as comprising: a slot for receiving the structural arm, wherein the slot comprises a sloped portion for receiving the structural arm at an angle; a filter bearing mating with the vacuum tube on a first side and mating the cylindrical filter cartridge on a second side, thereby providing translational and axial support respectively between moving components; a gasket adjacent to the filter bearing providing a snug fit between components; and an abutment adjacent to the gasket. Yet still further, the dust collection housing further comprising: a dump door having a latch and secured by a compression spring; and a dump door trigger for releasing the latch.

In a second aspect, the invention is a power saw comprising: a saw motor mechanically coupled to a motor power pulley rotating a drive belt about a drive pulley; a circular saw blade mechanically coupled to the drive pulley; a fan pulley rotatable by the drive belt and mechanically coupled to a vacuum fan via a fan drive shaft; and a dust collection housing for housing a filter, the dust collection house providing an area for dust to gather created as a by product of using the power saw.

Further in a second aspect, the power saw further comprises: a structural arm coupled to and substantially parallel to a blade guard, the blade guard having upper and lower portions, wherein the dust collection housing is coupled to the structural arm and the blade guard; and a cylindrical filter cartridge within the dust collection housing, wherein the fan is connected downstream of the cylindrical filter cartridge, the fan providing negative pressure with respect to atmosphere at the blade guard lower portion to filter and collect dust from a work piece created as a byproduct from use of the power saw.

Further the invention may be characterized wherein the dust collection housing further comprises: a slot for receiving the structural arm, wherein the slot comprises a sloped portion for receiving the structural arm at an angle; a filter bearing mating with the vacuum tube on a first side and mating the cylindrical filter cartridge on a second side, thereby providing translational and axial support respectively between moving components; a gasket adjacent to the filter bearing providing a snug fit between components; and an abutment adjacent to the gasket. Additionally, the dust collection housing further comprises: a dump door having a latch and secured by a compression spring; a dump door trigger for releasing the latch; a dust collection bin having a spring loaded door wherein the dump door is configured to fit within the dust collection bin having a spring loaded door for removing dust from the dust collection housing for storage in the dust collection bin.

Yet still further, the invention may be additionally characterized wherein the blade guard lower portion comprises: a retractable shroud about a pivot point; and a ridged jaw at a leading edge of the retractable shroud; and a roller configured to a lowest point on the ridged jaw, the roller for keeping the retractable shroud steady and in optimum position as it moves across the work piece thereby also reducing friction, wherein the blade guard lower portion forms a vacuum chamber from negative pressure with respect to atmosphere provided by the vacuum fan. In addition, the dust collection housing comprises: a fan housing configured between the structural arm and the cylindrical filter cartridge; a vacuum suction tube configured between the fan housing and the cylindrical filter cartridge; and a spin handle mechanically coupled to the cylindrical filer cartridge for rotating and optimizing the useful surface area thereof.

Still further, the power saw of may be characterized wherein the dust collection housing further comprising a filter cleaning flap for periodically maintaining and cleaning the filter.

In a third aspect, the invention is a method for cutting a work piece comprising: rotating a drive belt coupled to a saw motor; rotating a circular saw blade with the drive belt; covering the circular saw blade with a blade guard, the blade guard having a lower portion; imparting a negative pressure with respect to atmosphere to the blade guard lower portion; filtering dust created as a by product to the cutting the work piece; and collecting the dust within a dust collection housing.

Further, the method may be characterized as further comprising pleating the filter thereby increasing usable surface area of the cylindrical filter; and rotating a vacuum fan with the drive belt, wherein the vacuum fan provides the negative pressure to the blade guard lower portion. Yet further the method is characterized wherein the filter is a cylindrical filter, the method further comprising: coupling a spin handle to the cylindrical filter; rotating the cylindrical to increase the usable area of the filter; and cleaning the cylindrical filter with a filter cleaning flap.

Still further, the method further comprises: housing the drive belt within a structural arm; carving out a slot in the dust collection housing; and coupling the structural arm to the dust collection housing via the slot.

While the apparatus and method has or will be described for the sake of grammatical fluidity with functional explanations, it is to be expressly understood that the claims, unless expressly formulated under 35 USC §112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC §112 are to be accorded full statutory equivalents under 35 USC §112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Figure 1A:
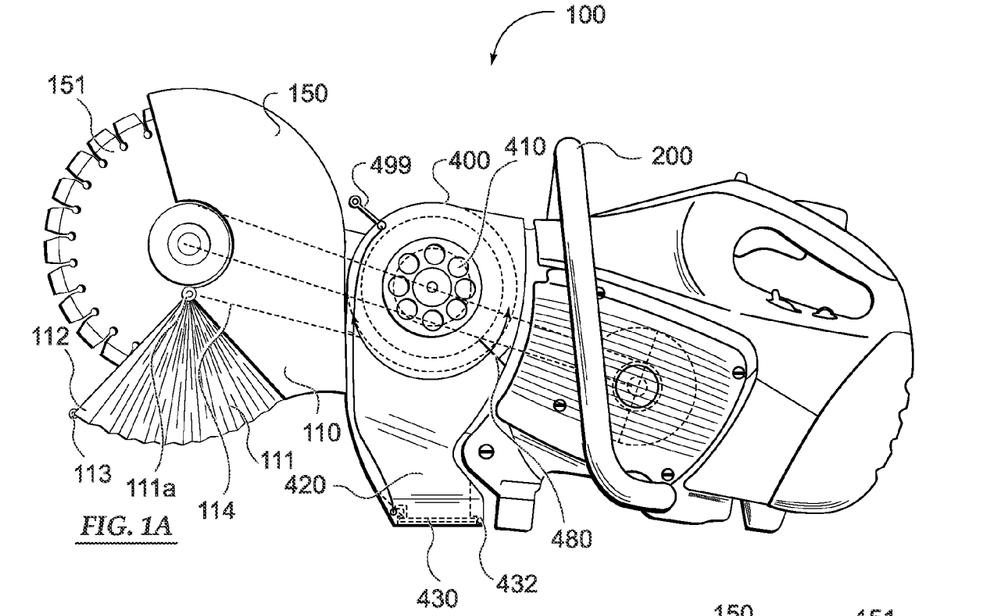
FIG. 1A is a left side profile view of a preferred embodiment power saw of the present invention.

Referring initially to FIG. 1A, a left side profile view of a power saw according to the present invention is illustrated. The preferred embodiment 100 comprises a portable handheld saw which is configured to cut metal, plastic or masonry. More specifically, masonry comprises stone, concrete, brick, and other materials. The power saw and dust collection system 100 is powered by a motor in the after part of the saw. The working end comprises a rotating blade 151 protected by a blade guard 150 having upper and lower portions. Importantly, the lower blade guard forms a vacuum channel 110 for dust and particulate to flow initiating dust containment. Additionally, the lower blade guard comprises a foldable adjustable, retractable shroud 111 about a pivot point 111a. A leading edge of the shroud 111 has a ridged jaw 112 while the shroud 111 may be made from bendable material. Further, the bottom most portion of the ridged jaw 112 comprises a roller 113 to assist in alignment with moving along a work piece.

Still regarding FIG. 1A, upper barrier 114 is included to help form vacuum channel 110. Arrow 120 shows how air flow moves within the device. When the air 120 containing particulate matter moves along the rear of the vacuum chamber 110, it enters the dust collection housing 400 of the unit. As further illustrated in FIGS. 4A through 4F, dust collection housing is an integral unit and unique to the present invention. Eventually, following filtering of air containing particulate matter, dust will settle to the dust collection area 420. Following prolonged use of the device, dust may be removed from the dust collection area with dump door 430 as further illustrated in FIG. 3.

Figure 1B:
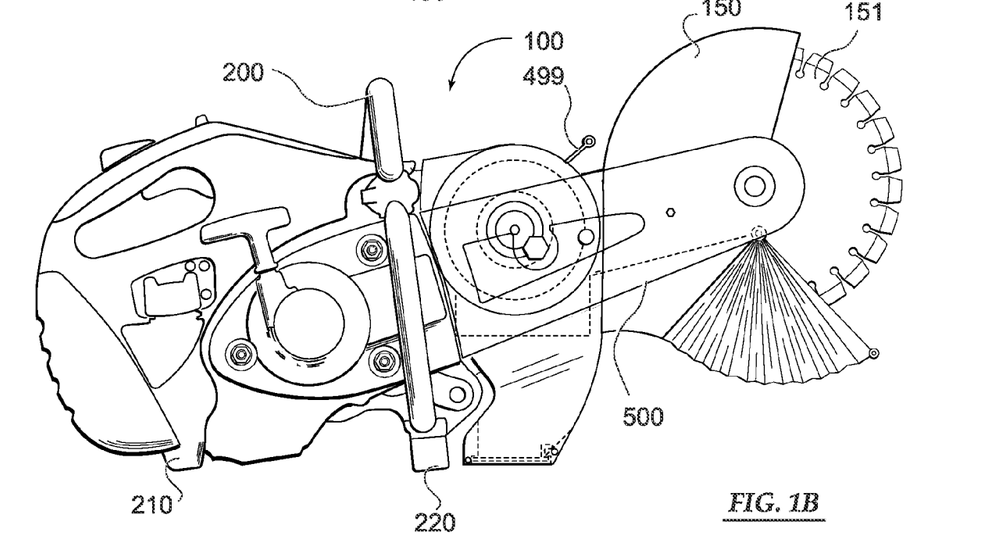
FIG. 1B is a right side profile view of a the embodiment illustrated in FIG. 1B.

Referring to FIG. 1B, a right side of the power saw embodiment is illustrated. On this side of the device, a structural arm 500 is shown that houses the drive components for the circular saw 151. Preferably, the structural arm 500 may be made from aluminum of other suitable material such as a composite, thereby keeping the weight of the apparatus 100 to a minimum. The bulk of the weight will be contained in the after part of the device 100. Hence, forward and after saw motor feet 220, 210 are provided on opposing sides of a center of gravity so that the device 100 is balanced when resting on a flat surface.

Figure 2A:
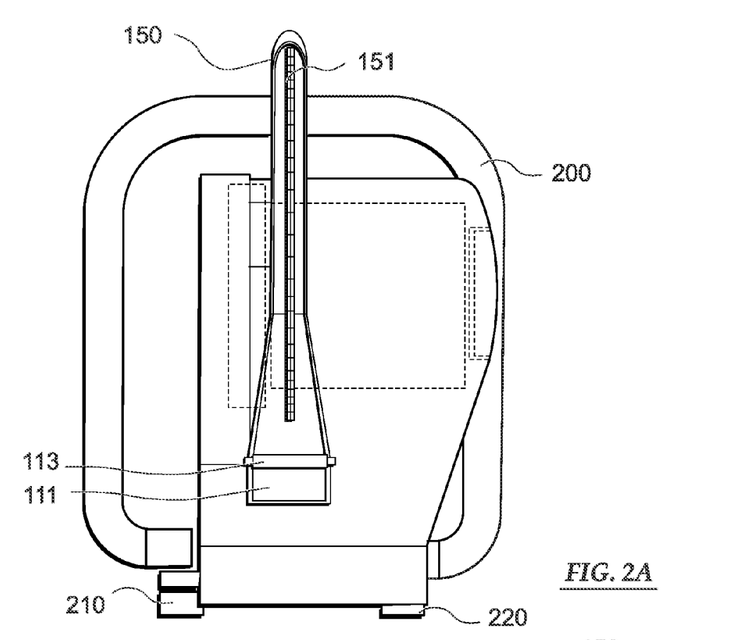
FIG. 2A is a front view of a preferred invention embodiment.
Figure 2B:
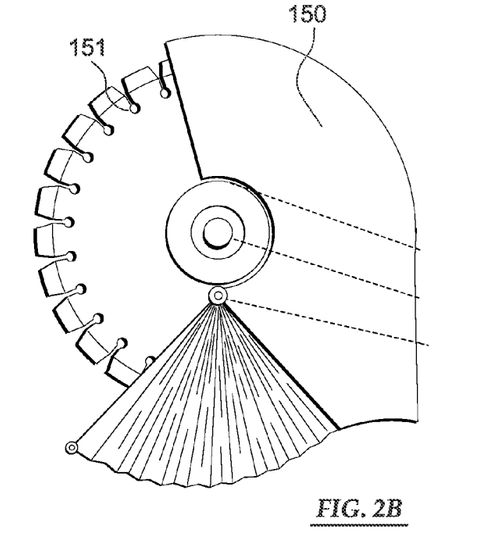
FIGS. 2B and 2C are a left view and a right view of the cutting portions of a preferred power saw for comparison to FIG. 2A.
Figure 2C:
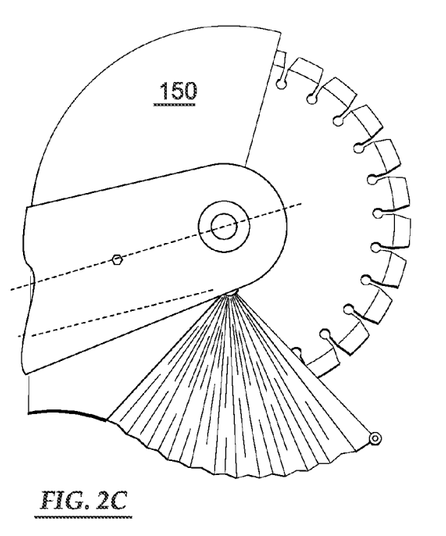

FIG. 2A reveals a frontal view of the device. Handle 200 may additionally be made from aluminum or relatively light weight material. The shape and structure of the handle 200 is generally that of a racetrack; or more specifically, handle 200 is a an elongated cylindrical material that is further shaped to a rectangle or a square around the device with rounded corners similar to a racetrack. A front view of the dust collection housing 400 can also be seen in FIG. 2A. Also, FIG. 4 may be cross referenced with FIG. 2A as this figure shows a frontal of the dust collection housing 400 in another level of detail. FIG. 2B and FIG. 2C provide a frame of reference for viewing FIG. 2A.

Figure 3:
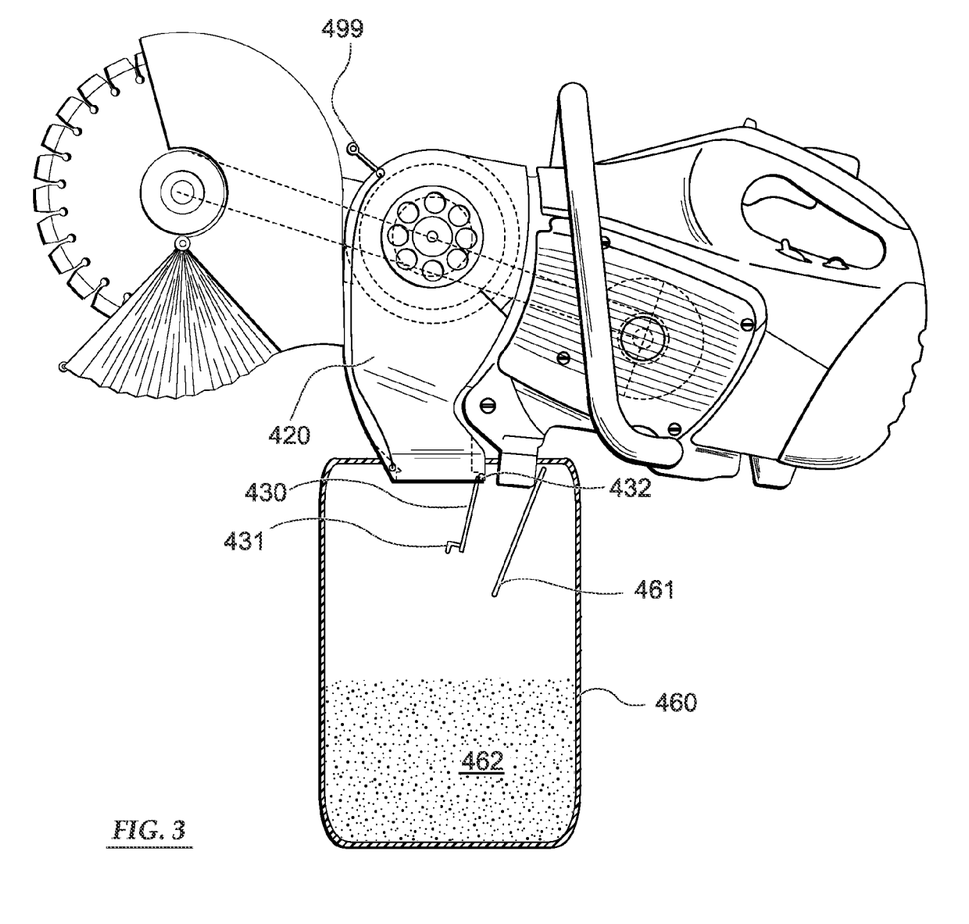
FIG. 3 illustrates a preferred dust collection bin of the present invention.

With regard to FIG. 3, a dust bin 460 is illustrated, the dust bin 460 provided to remove dust accumulated in the dust collection area 420. The area around dump door 430 is configured to mate with an area around and inside bin door 461 as shown. In a preferred embodiment, dump door 430 is held in place by latch 431 until trigger 499 is actuated releasing latch 431. Since latch 431 is held against spring 432 force in the closed position, dump door becomes open when latch 431 is released by trigger 499. Subsequent to the removal and storage of dust 462 in bin 460, door 430 may be returned to its shut position manually.

Figure 4A:
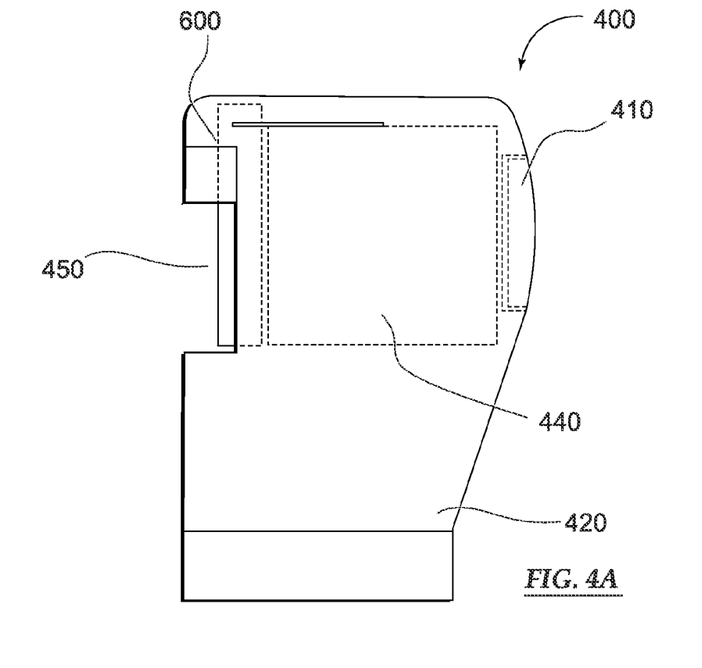
FIG. 4A is a front view of a dust collection housing embodiment of the invention.
Figure 4B:
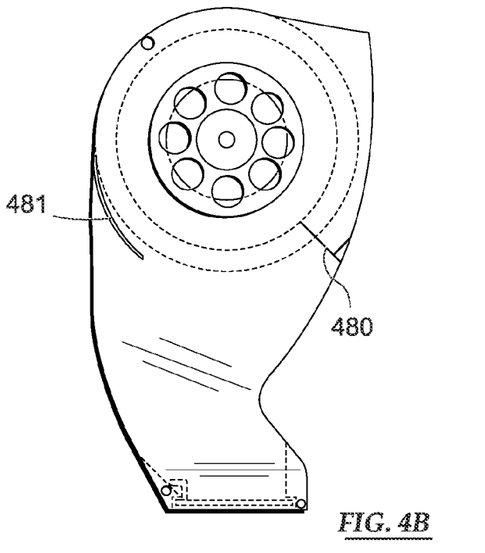
FIGS. 4B and 4C are left and right views of the dust collection housing embodiment shown in FIG. 4A.
Figure 4C:
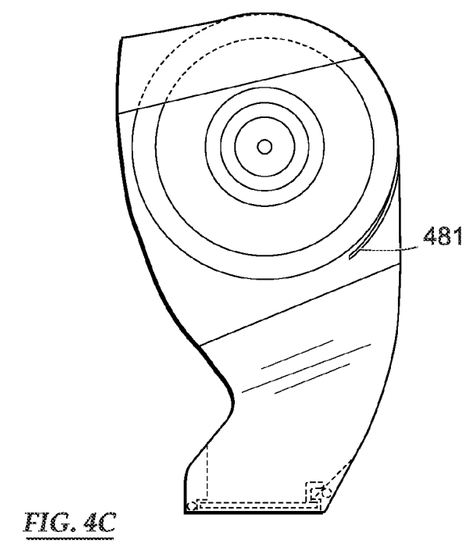
Figure 4D:
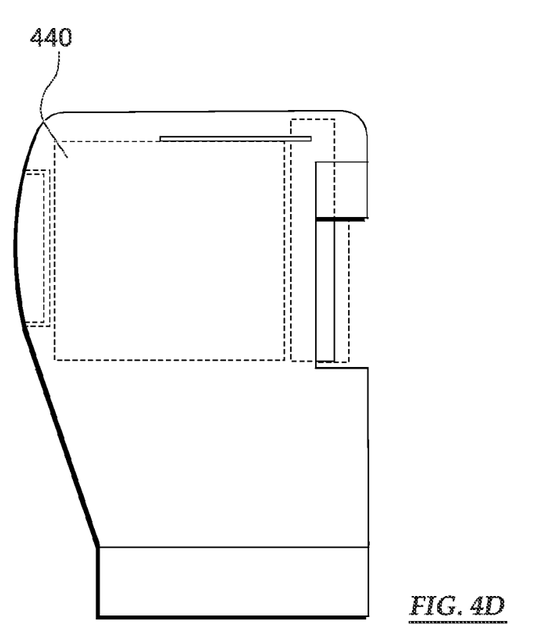
FIG. 4D is a rear view of the dust collection housing.
Figure 4E:
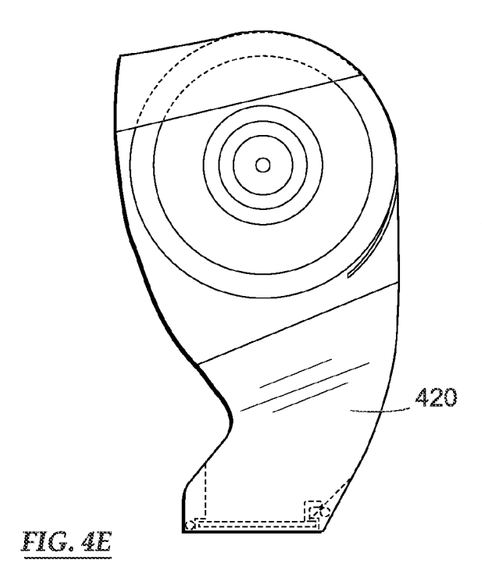
FIG. 4E and FIG. 4F are right and left views of the dust collection housing shown as in relation to FIG. 4D.
Figure 4F:
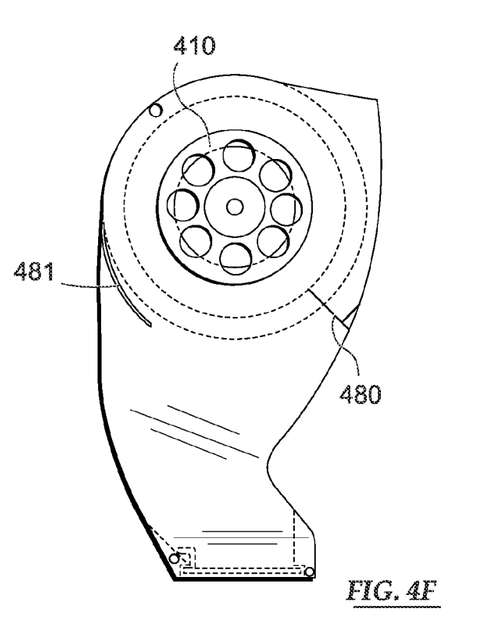

Regarding FIG. 4A, a preferred dust collection housing 400 is illustrated in more detail than in previous views. In this particular embodiment, a cylindrical filter 440 is employed. Spin handle 410 is provided to rotate cylindrical filter 440 to increase its usable surface area in addition to maintaining and cleaning the filter 440. Other filters having different shapes and sizes may also be employed to filter air that having dust 462 and particulate matter. Fan housing 600 is provided adjacent to cylindrical filter 440 providing an area of negative pressure with respect to atmosphere. Additionally, cylindrical filter 440 may be pleated to further increase usable surface area. Slot 450 is provided to configure structural arm 500 to a right side of the device. FIG. 4B and FIG. 4C are shown to provide reference for FIG. 4A. It is additionally contemplated a mold can be made for the manufacturing of dust collection housing 400. Therefore, dust collection housing 400 could be made from suitable plastic by injection molding and thereby making this component 400 light weight and easily mass producible.

Also according to the invention, dust collection housing 400 further comprises a filter cleaning flap 480 in contact with cylindrical filter 440. As a user rotates spin handle 410, filter cleaning flap 480 helps remove dust adhered to the filter 440 to settle in the dust collection area 420. Additionally, filter guard 481 partially surrounds the cylindrical filter as shown in FIG. 4C.

Figure 5A:
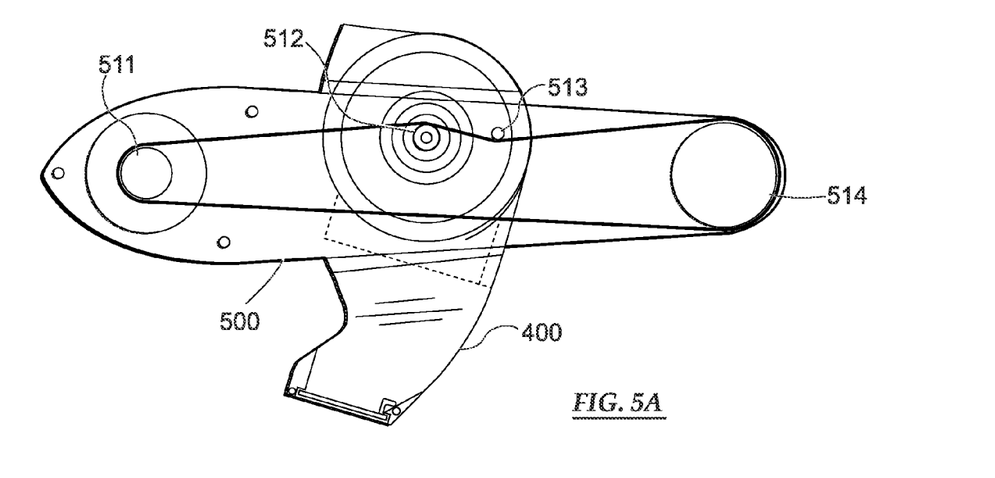
FIG. 5A is a side aspect view of a structural arm of the present invention configured to a dust collection housing.
Figure 5B:
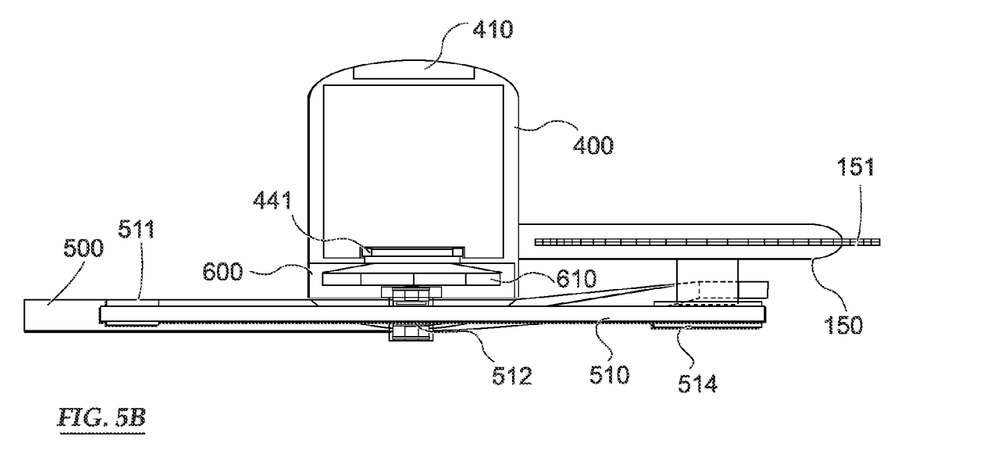
FIG. 5B is a top view of a structural arm configured to a dust collection housing additionally configured to a blade guard portion of the present invention.

With reference to FIG. 5A, a structural arm 500 configured to a dust collection housing 400 as illustrated also revealing inside mechanical components of the arm 500. Initially, motor power pulley 511 is coupled to a shaft output of an electric or internal combustion motor (not shown). In turn, motor power pulley 511 is coupled to a drive belt 510 and rotates saw blade drive pulley 514 that ultimately transfers power to rotate circular saw blade 151. In addition to providing power to drive saw blade 151, drive belt is also coupled to fan pulley 512 that in turn, transfers power to vacuum fan 610 as shown in FIG. 5B. Still further, is can be seen in FIG. 5B how structural arm 500 is coupled to blade guard 150, that is in turn coupled to dust collection housing 400, that is in turn coupled back to structural arm 500 with fan housing 600 sandwiched in between.

Figure 6:
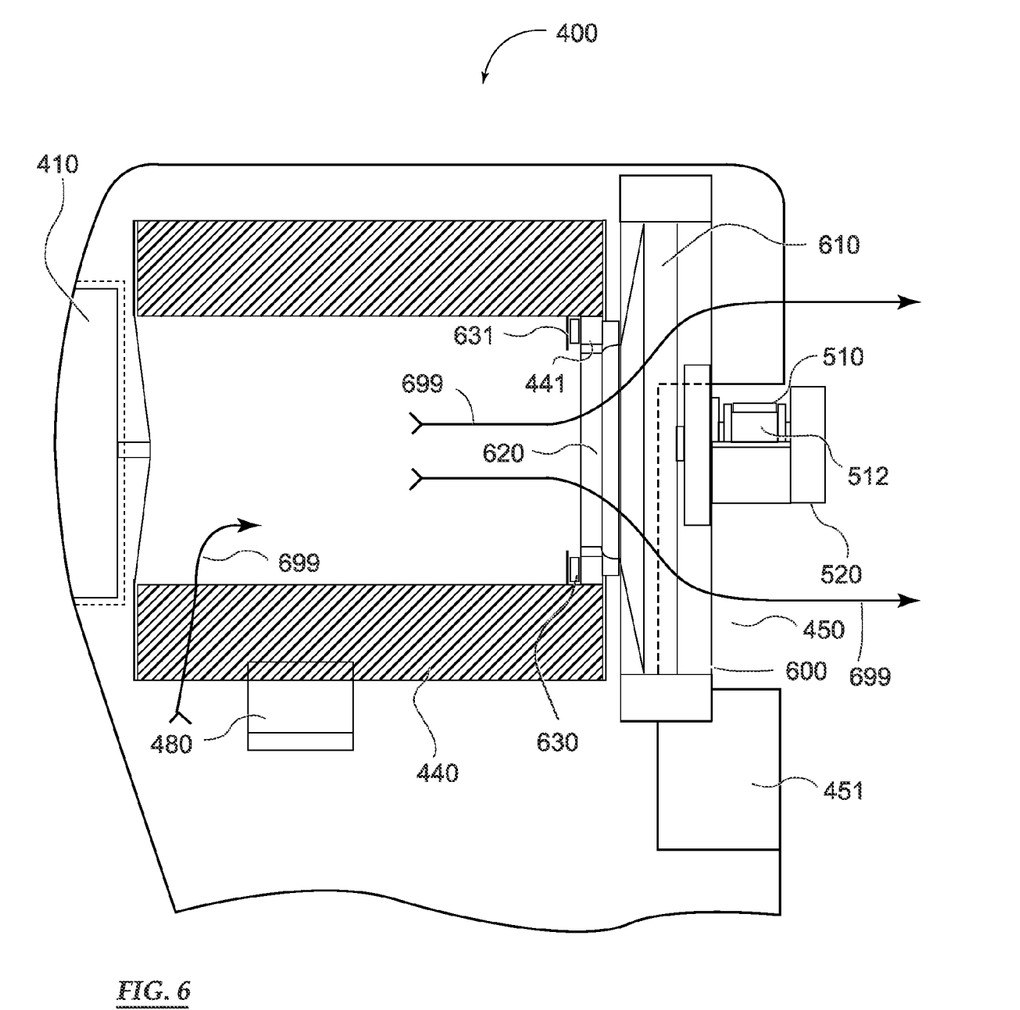
FIG. 6 is an enlarged view of a dust collection housing also illustrated in FIG. 4D.
Figure 7A:
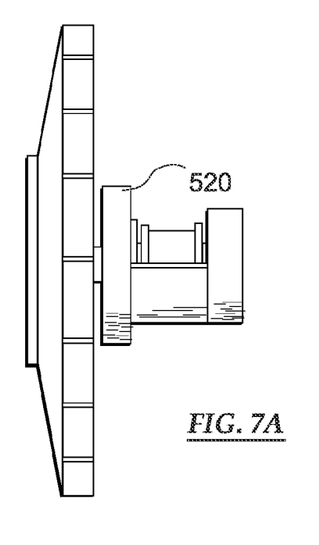
FIG. 7A, FIG. 7B, FIG. 7C and FIG. 7D illustrate a vacuum fan and drive components of a preferred embodiment of the present invention.
Figure 7B:
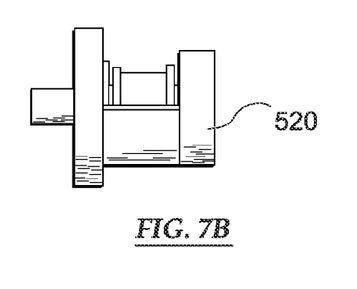
Figure 7C:
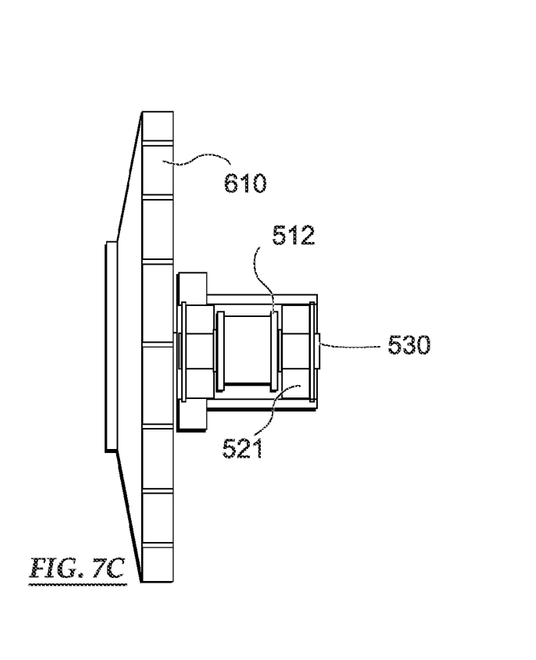
Figure 7D:
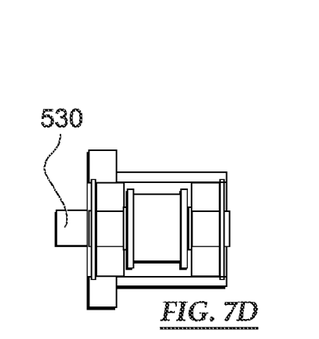

FIG. 6 illustrates an enlarged view of the dust collection housing 400 illustrated in FIG. 2A and again in FIG. 4A. In this figure, arrows 699 depict a direction of air flow. Fan 610 provides the negative pressure to initiate air flow 699. Fan housing 600 is connected to an inside area of cylindrical filter 440 via vacuum tube 620. Filter bearing 441 provides support between moving parts and rests against abutment 631 via gasket 630. Filter bearing 441 also provides support on two sides against vacuum tube 620 as shown, as well as supporting the cylindrical filter 410 on an opposing/adjacent side. Also referring to FIG. 6, fan pulley 512 is partially enclosed within fan bearing block 520 on bottom, front and rear portions. Additionally in this view, slot 450 can be seen to have a slope 451 to receive structural arm at an angle.

FIG. 7A, FIG. 7B, FIG. 7C and FIG. 7D show illustrate closer views of fan bearing block 520, vacuum fan 610, fan bearing 521 and fan drive shaft 530.

While the particular Power Saw Apparatus with Integrated Dust Collector herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A power saw comprising:
   a structural arm coupled to and substantially parallel to a blade guard, the blade guard having upper and lower portions;
   a dust collection housing coupled to the structural arm and integrated with the power saw proximate to the blade guard;
   a cylindrical filter cartridge within the dust collection housing; and
   a fan connected downstream of the cylindrical filter cartridge, the fan providing negative pressure with respect to the atmosphere at the blade guard lower portion, wherein the blade guard lower portion is configured to form a vacuum channel that facilitates collecting dust from a work piece created as a byproduct from use of the power saw, and wherein the blade guard lower portion further comprises a foldable retractable shroud made from bendable material.

2. The power saw of claim 1 comprising:
   a saw motor mechanically coupled to a motor pulley rotating a drive belt about a drive pulley;
   a circular saw blade mechanically coupled to the drive pulley;
   a fan pulley rotatable by the drive belt and mechanically coupled to the fan via a fan drive shaft; and
   a tensioning roller providing proper tension and alignment to the drive belt.

3. The power saw of claim 2, wherein the fan pulley is surrounded by a bearing block on front, rear and lower portions of the fan pulley, wherein the bearing block comprises a fan bearing providing rotational and translational support to the fan drive shaft.

4. The power saw of claim 1, the blade guard lower portion further comprising:
   a ridged jaw at a leading edge of the retractable shroud; and
   a roller on a lowest point on the ridged jaw, wherein the roller is configured to align the retractable shroud as it moves across the work piece.

5. The power saw of claim 1, the dust collection housing comprising:
   a fan housing configured between the structural arm and the cylindrical filter cartridge;
   a vacuum suction tube configured between the fan housing and the cylindrical filter cartridge; and
   a spin handle mechanically coupled to the cylindrical filter cartridge for rotating and optimizing the useful surface area thereof.

6. The power saw of claim 5, the dust collection housing comprising:
   a slot for receiving the structural arm, wherein the slot comprises a sloped portion for receiving the structural arm at an angle;
   a filter bearing mating with the vacuum tube on a first side and mating the cylindrical filter cartridge on a second side, thereby providing translational and axial support respectively between moving components;
   a gasket adjacent to the filter bearing providing a snug fit between components; and
   an abutment adjacent to the gasket.

7. The power saw of claim 1, the dust collection housing comprising:
   a dump door having a latch and secured by a compression spring; and
   a dump door trigger for releasing the latch.

8. A power saw comprising:
   a saw motor mechanically coupled to a motor pulley rotating a drive belt about a drive pulley;
   a circular saw blade mechanically coupled to the drive pulley;
   a fan pulley rotatable by the drive belt and mechanically coupled to a vacuum fan via a fan drive shaft; and
   a dust collection housing for housing a cylindrical filter, the dust collection housing integrated with the power saw proximate to a blade guard and providing an area for dust to gather created as a byproduct of using the power saw, wherein a lower portion of the blade guard comprises a foldable retractable shroud made from bendable material and is configured to form a vacuum channel from negative pressure with respect to atmosphere provided by the vacuum fan.

9. The power saw of claim 8, further comprising:
   a structural arm coupled to and substantially parallel to the blade guard, wherein the dust collection housing is coupled to the structural arm and the blade guard; and
   a cylindrical filter cartridge within the dust collection housing, wherein the fan is connected downstream of the cylindrical filter cartridge.

10. The power saw of claim 9, the dust collection housing further comprising:
    a slot for receiving the structural arm, wherein the slot comprises a sloped portion for receiving the structural arm at an angle;
    a filter bearing mating with a vacuum tube on a first side and mating the cylindrical filter cartridge on a second side, thereby providing translational and axial support respectively between moving components;
    a gasket adjacent to the filter bearing providing a snug fit between components; and
    an abutment adjacent to the gasket.

11. The power saw of claim 8, the dust collection housing further comprising:
    a dump door having a latch and secured by a compression spring; and
    a dump door trigger for releasing the latch; and
    a dust collection bin having a spring loaded door wherein the dump door is configured to fit within the collection bin having a spring loaded door for removing dust from the dust collection housing for storage in the dust collection bin.

12. The power saw of claim 8, the lower portion of the blade guard comprising:
    a ridged jaw at a leading edge of the retractable shroud; and
    a roller on a lowest point on the ridged jaw, wherein the roller is configured to align the retractable shroud as it moves across the work piece.

13. The power saw of claim 8, the dust collection housing comprising:
    a fan housing configured between the structural arm and the cylindrical filter cartridge;
    a vacuum suction tube configured between the fan housing and the cylindrical filter cartridge; and
    a spin handle mechanically coupled to the cylindrical filter cartridge for rotating and optimizing the useful surface area thereof.

14. The power saw of claim 8, the dust collection housing further comprising a filter guard partially following a shape of the filter.

15. The power saw of claim 8, the dust collection housing further comprising a filter cleaning flap for periodically maintaining and cleaning the filter.

16. A power saw comprising:
a structural arm coupled to and substantially parallel to a blade guard;
a dust collection housing coupled to the structural arm and integrated with the power saw proximate to the blade guard, the dust collection housing having a lower portion for holding dust from a work piece;
a cylindrical filter cartridge within the dust collection housing; and
a fan connected downstream of the cylindrical filter cartridge, the fan providing negative pressure with respect to atmosphere at the blade guard lower portion, wherein the blade guard lower portion is configured to form a vacuum channel that facilitates collecting dust from the work piece created as a byproduct from use of the power saw, and wherein the blade guard lower portion further comprises a foldable retractable shroud made from bendable material.

17. The power saw of claim 16, the lower portion for holding dust from a work piece further comprising a dump door transferring dust from the dust collection housing.

* * * * *